Patented Nov. 9, 1943

2,333,655

UNITED STATES PATENT OFFICE 2,333,655

ANTIOXIDANT FOR FATS AND OILS

Henry A. Mattill and Calvin Golumbic, Iowa City, Iowa, assignors to Lever Brothers Company, Cambridge, Mass., a corporation of Maine No Drawing. Application March 31, 1942, Serial No. 436,954

5 Claims. (Cl. 99—163)

This invention relates to methods and materials for preserving oils, fats, and food products containing the same by retarding oxidation and the development of rancidity therein, as well as to the oils, fats, and food products preserved by such methods and materials.

An object of the invention is to provide a practical method for preserving food substances and particularly oils and fats, by the addition thereto of a small amount of materials that prevent or postpone injurious oxidation and rancidity changes.

In particular, it is an object of this invention to employ small amounts of two or more materials which, when used together, exert a synergistic antioxidant action. That is, the antioxygenic effect obtained by the two materials is much greater than the sum of the antioxygenic effects of the several materials when used separately.

A further object of the invention is to accomplish this stabilizing action of oils and fats without the use of harmful chemicals or adulterants, but rather by means of ingredients which in themselves are desirable from the nutritional standpoint.

It is well known that oils and fats often become rancid and unfit for human consumption. This is particularly true in the case of oils and fats that have been subject to refining or processing operations, or which must be stored for an appreciable time before they are used. It is desirable to prevent the changes from taking place, which result in rancidity, or at least postpone the time at which they occur, to an extent such that the oils and fats may be utilized before any undesirable action takes place.

The constituents of oils and fats are well known in chemistry to possess a tendency to absorb and react with oxygen. The development of rancidity results primarily from the products formed during oxidation. The dissolved or absorbed oxygen usually reacts first to form peroxides. The development of the peroxides is accelerated by moisture, heat, light or catalysts. Aldehydes, ketones and acids of lower molecular weight are formed in the further decomposition and these materials impart an undesirable odor and taste to the oil or fat.

The efficiency of an antioxidant may be expressed in terms of the resistance of an oil or fat to the absorption of oxygen. When an oxidizable oil or fat is exposed to air under standardized conditions, a definite time interval elapses before there is any appreciable absorption of oxygen by the oil or fat. This interval is termed the "induction period." It is possible, therefore, to denote the action of an antioxidant in terms of its ability to prolong the induction period. This method has been standardized and can be carried out conveniently by a comparison of the stabilized oil or fat with a control, i. e., an oil or fat not containing an antioxidant but which has been otherwise treated under like conditions. Such a test may be employed in evaluating the antioxidants referred to more particularly hereinafter and will be referred to in denoting the extent of their antioxidant action.

The fats and oils to which the invention is applicable comprise the glycerides of fatty acids. These may be obtained from the naturally occurring animal or vegetable oils and fats or from synthetic sources. Lard, in particular, is an example of a fat from an animal source that has a tendency to turn rancid and is, therefore, improved as to keeping qualities by the addition of an antioxidant. Vegetable oils, such as cottonseed oil, palm oil, sesame oil, soyabean oil, peanut oil, sunflowerseed oil, etc., are examples of vegetable oils to which an antioxidant may be added. Shortenings of the dry plastic type composed of partially hydrogenated oils may also be protected by antioxidants, as well as similar shortenings produced by compounding an oil with a hard fat.

In expressing the antioxygenic activity of an antioxidant, the oxygen absorption method may readily be used in the case of lard, but this method can not be applied so satisfactorily in the case of vegetable oils. Lard demonstrates a definite induction period after which the absorption of oxygen is rapid.

Vegetable oils absorb oxygen more slowly and the end of the induction period is not sharply defined. Furthermore, the oxygen absorption method is time-consuming when applied to vegetable oils unless high temperatures are used. Inasmuch as a temperature of 70–80° C. has proved to be a convenient temperature at which to measure oxygen absorption, a method was developed for reducing the induction period of these oils to a convenient interval, while at the same time retaining the properties of the oils with regard to their effect by antioxidants.

The most satisfactory method proved to be the use of methyl or ethyl esters of the fatty acids of the oil or fat. As illustrative of their preparation, two parts of absolute alcohol containing 2% to 3% hydrogen chloride is added to one part of the oil or fat, and the mixture is refluxed on a steam bath for 18 to 24 hours. The mixture is then cooled and diluted with water. The ester layer is washed repeatedly with water to remove the hydrochloric acid and alcohol, then centrifuged free from occluded water, and finally heated on a steam bath in a vacuum to remove any traces of solvents. The remaining liquid contains the ethyl esters of the fatty acids, the unsaponifiable constituents of the original oil or fat, and possibly traces of unhydrolyzed glycerides. The glycerol and any water-soluble constituents will have been removed.

The product so obtained from a partially hydrogenated cottonseed oil, for example, could be used to assay antioxidants by the oxygen absorption method since the product has a convenient induction period and a rapid rate of oxygen absorption at the end of the induction period. Furthermore, the protection offered to the product by various antioxidants was qualitatively parallel to that conferred upon the original fat.

Other materials that can be used in determining the effectiveness of antioxidants include the fatty acids of oils and fats, and the distilled esters of oils and fats.

The compounds which we use synergistically as antioxidants are also known as vitamins or are closely related chemically to certain vitamins. The synergistic antioxidant action of the compounds used is to be distinguished from their physiological action and the fact that they have a vitaminic action is more or less incidental insofar as the invention is concerned. The amounts used are so small that an oil or fat stabilized with the compounds used would not be a good source for any vitamins needed by the body. Also certain compounds, very closely related chemically, function as synergistic antioxidants in accordance with the invention, but do not have the physiological effect of the vitamins. This also suggests that the vitaminic action of certain of the antioxidants used in accordance with the invention is without significance. It is desirable, however, that the antioxidants used are vitamins or closely related compounds, because their use does not introduce a deleterious chemical into the oil or fat. This is important when the oil or fat is intended for human consumption.

We have discovered that the simultaneous inclusion in an oil or fat of both an ascorbic acid and a tocopherol (and certain chemically related compounds) results in a synergistic action by means of which a pronounced antioxidant effect is obtained. In other words, when these two compounds are employed together, the antioxygenic effect obtained by the use of these combined materials is appreciably more than the additive antioxygenic effects of the compounds, if any, when employed separately. We believe this to be unexpected from any consideration of the properties of the individual compounds.

The ascorbic acid may be used in the form of any of its isomers, and the l-form is not essential but would probably be used commercially because of its availability.

The compounds that act synergistically with the ascorbic acid comprise the class of chromans, including the hydroxychromans, such as the 6-hydroxychromans, the $\alpha$-$\beta$-$\gamma$-tocopherols, and the alkyltocols, such as 5,7-dimethyltocol; the chromens including the hydroxychromens, such as the 6-hydroxychromens and alkyl substituted compounds; the coumarans including the hydroxycoumarans, such as the 5-hydroxycoumarans and alkyl substituted compounds, the hydroxyisocoumaranones and aromatic and alkyl substituted compounds, such as the 5- and 7-hydroxy- isocoumaranones; the coumarones including the hydroxycoumarones, such as the 5-hydroxycoumarones, and the chroman-5,6-quinones and their precursors which are associated with vitamin E.

As illustrative of the invention, an ascorbic acid and $\alpha$- and $\beta$-tochopherol were added to lard as indicated in the following table in which the results are set forth.

Table I

| Substrate | Antioxidants added | Induction period in hours | | Increase in hours |
|---|---|---|---|---|
| | | With antioxidant | Control | |
| Lard | 0.10% ascorbic acid | 24 | 21 | 3 |
| Do | 0.04% $\beta$-tocopherol | 169 | 21 | 148 |
| Do | 0.10% ascorbic acid + 0.04% $\beta$-tocopherol | 268 | 21 | 247 |
| Do | 0.04% $\alpha$-tocopherol | 61 | 21 | 40 |
| Do | 0.10% ascorbic acid + 0.04% $\alpha$-tocopherol | 100 | 21 | 79 |

That the results are attributable to a coaction of the ascorbic acid and the tocopherol is indicated by the following data showing the amount of tocopherol (in micro-grams) present in one gram of the ethyl esters of lard fatty acids in the presence and absence of an ascorbic acid:

Table II

| Time | No ascorbic acid | 0.05% ascorbic acid | 0.10% ascorbic acid |
|---|---|---|---|
| 0 | 1,000 | 1,000 | 1,000 |
| 3 | | 540 | 482 |
| 5 | 66 | | |
| 10 | Trace | | |
| 20 | 0 | | |
| 44 | | 313 | 336 |
| 66 | | 120 | 164 |
| 70 | | 0 | 35 |
| | | | 0 |

As further illustrative of the invention, the results are given when the invention is applied to the ethyl esters of a hydrogenated mixture of vegetable oils. Said ethyl esters contained 0.007% tocopherol and had an induction period of 31 hours. When to these esters was added 0.02% ascorbic acid, the tocopherol and ascorbic acid coacted so that the resulting product had an induction period of over 300 hours. The test was discontinued after this length of time since it was clearly sufficient to demonstrate the new results.

Similarly, ethyl esters of a hydrogenated mixture of vegetable oils containing 0.24% tocopherol had an induction period of 60 hours, and when to this mixture was added 0.02% ascorbic acid, the induction period was over 200 hours, at which time the test was discontinued for the reason noted above.

That this improvement must be attributed to the synergistic coaction of the ascorbic acid and the tocopherol is quite clear from the fact that ethyl esters of vegetable oils, or vegetable oils themselves, not containing the tocopherol cannot be stabilized by means of ascorbic acid alone.

The invention has been illustrated with ascorbic acid and the tocopherols, since these would probably be used in practicing the invention because of their availability. The other compounds contemplated herein, however, would produce somewhat similar results.

For example, ascorbic acid and a chromain- 5,6-quinone act synergistically as shown in the following table:

Table III

| Substrate | Antioxidants added | Induction period in hours | |
|---|---|---|---|
| | | With antioxidant | Control |
| Ethyl esters of hydrogenated vegetable oil (tocopherol free). | 0.02% chroman-5,6-quinone. | 44 | 11 |
| Do | 0.10% ascorbic acid | 12 | 11 |
| Do | 0.02% chroman-5,6-quinone+0.10% ascorbic acid. | [1] 144++ | 11 |

[1] Fresh when discontinued.

It should be noted that some naturally occurring fats and oils, particularly those from certain vegetable sources contain a small amount of tocopherol as a natural ingredient. In those instances and where the amount is sufficient for the purpose, it may not be necessary to add an additional quantity of tocopherol from an outside source. In instances where the tocopherol is present, but not sufficient in amount, it may be supplemented.

The amounts used are not particularly critical and relatively small amounts can be used; there is probably no minimum of any substance which will not yield some result. The use of more than is necessary would not be economical. For commercial purposes it is probably desirable to have the compounds in the amount of from 0.005% to 0.1%.

The chemistry involved in the coaction of the ascorbic acid and the tocopherol is not entirely understood. In a description of the invention published in the May 1941 issue of the Journal of the American Chemical Society, at page 1279, certain suggestive observations were made. However, having fully disclosed our invention, and the manner in which it may be practiced, we do not wish to be limited to any theory of operation.

Ascorbic acid is known to act as an antioxidant but its peculiar effectiveness as a synergist in association with the tocopherols and related phenolic substances has heretofore not been recognized. The use of an ascorbic acid in an oil or fat having tocopherol as a natural or added ingredient, in which both the compounds are present in the oil or fat itself so as to assert the synergistic action, is to be distinguished from the use of ascorbic acid in an oil and water emulsion, such as mayonnaise, in which the ascorbic acid is present in the aqueous phase and any tocopherol that may be present is in the oil phase.

It will be obvious that our invention contemplates numerous alternative and equivalent embodiments other than those specifically mentioned as illustrative, and all of the same are intended to be included within the invention as claimed hereinafter.

We claim:

1. A composition of matter comprising an oleaginous material in which material is included both a small amount of an ascorbic acid and a small amount of tocopherol type compound selected from the group consisting of hydroxychromans, tocopherols, alkyltocols, hydroxycoumarans, hydroxycoumarones, hydroxyisocoumaranones and the chroman-5,6-quinones and their precursors which are related to vitamin E, said combination producing a synergistic action of inhibiting oxidation and the development of rancidity in the oleaginous matter.

2. A composition of matter comprising an oleaginous material in which material is included both a small amount of an ascorbic acid and a tocopherol, said combination producing a synergistic action of inhibiting oxidation and the development of rancidity in the oleaginous matter.

3. A plastic, dry, edible shortening formed from hydrogenated vegetable oil, in which is included a small amount of an ascorbic acid and a tocopherol, said combination producing a synergistic action of inhibiting oxidation and the development of rancidity in said shortening.

4. A process of inhibiting oxidation and the development of rancidity in oleaginous matter, which comprises incorporating in said oleaginous matter a small amount of an ascorbic acid and a small amount of tocopherol type compound selected from the group consisting of hydroxychromans, tocopherols, alkyltocols, hydroxycoumarans, hydroxycoumarones, hydroxyisocoumaranones and the chroman-5,6-quinones and their precursors which are related to vitamin E.

5. A plastic, dry, edible shortening formed from hydrogenated vegetable oil, in which is included 0.005% to 0.1% each of an ascorbic acid and a tocopherol, said combination producing a synergistic action of inhibiting oxidation and the development of rancidity in said shortening.

HENRY A. MATTILL.
CALVIN GOLUMBIC.

CERTIFICATE OF CORRECTION.

Patent No. 2,333,655.   November 9, 1943.

HENRY A. MATTILL, ET AL.

It is hereby certified that error appears in the printed specification of the above numbered patent requiring correction as follows: Page 2, second column, line 75 and page 3, first column, line 1, for "chromain-5,6-quinone" read --chroman-5,6-quinone--; and that the said Letters Patent should be read with this correction therein that the same may conform to the record of the case in the Patent Office.

Signed and sealed this 14th day of December, A. D. 1943.

(Seal)

Henry Van Arsdale,
Acting Commissioner of Patents.